United States Patent
Allen et al.

(10) Patent No.: US 9,235,956 B2
(45) Date of Patent: Jan. 12, 2016

(54) GROUP GAMES AND REWARDS IN WAGERING SYSTEMS

(75) Inventors: Jeffrey L. Allen, Naperville, IL (US);
Damon E. Gura, Chicago, IL (US);
Jeremy M. Hornik, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 89 days.

(21) Appl. No.: 12/810,685

(22) PCT Filed: Dec. 26, 2008

(86) PCT No.: PCT/US2008/088381
§ 371 (c)(1),
(2), (4) Date: Jun. 25, 2010

(87) PCT Pub. No.: WO2009/086489
PCT Pub. Date: Jul. 9, 2009

(65) Prior Publication Data
US 2010/0279764 A1    Nov. 4, 2010

Related U.S. Application Data

(60) Provisional application No. 61/017,003, filed on Dec. 27, 2007.

(51) Int. Cl.
*A63F 9/24* (2006.01)
*A63F 13/00* (2014.01)
(Continued)

(52) U.S. Cl.
CPC ............ *G07F 17/3239* (2013.01); *A63F 13/10* (2013.01); *A63F 13/12* (2013.01); *G07F 17/32* (2013.01); *A63F 2300/5553* (2013.01)

(58) Field of Classification Search
CPC .. A63F 13/00; A63F 13/12; A63F 2300/5553
USPC ........................................................ 463/25
See application file for complete search history.

(56) References Cited

U.S. PATENT DOCUMENTS 5,470,079 A   11/1995  LeStrange et al.
6,068,552 A    5/2000  Walker et al.
(Continued)

FOREIGN PATENT DOCUMENTS

WO   WO-2009086489   7/2009

OTHER PUBLICATIONS

"PCT Application No. PCT/US08/88381 International Preliminary Report on Patentability", Aug. 16, 2010, 12 pages.
(Continued)

*Primary Examiner* — Kang Hu
*Assistant Examiner* — Marcus Jones
(74) *Attorney, Agent, or Firm* — DeLizio Law, PLLC

(57) ABSTRACT

Described herein are processes and devices that determine and assign rewards as a group in a wagering game system utilizing social contacts. One of the devices described herein, a wagering game system, determines a first player account associated with a wagering game and looks at the first player account to determine a second player account associated with the first player account as a social network contact. The first player account and the second player account comprise a group of members in a group game or challenge. The wagering game system determines a reward that can be assigned to the group members. The wagering game system determines one or more tasks that must be performed before assigning the reward. The wagering game system presents the one or more tasks to the group members. The wagering game system detects when the tasks are completed and assigns the reward to the group members.

22 Claims, 11 Drawing Sheets

(51) Int. Cl.
*G07F 17/32* (2006.01)
*A63F 13/40* (2014.01)
*A63F 13/30* (2014.01)

(56) References Cited

U.S. PATENT DOCUMENTS

| | | | |
|---|---|---|---|
| 6,110,041 A | 8/2000 | Walker et al. | |
| 6,142,872 A * | 11/2000 | Walker et al. | 463/16 |
| 6,254,483 B1 | 7/2001 | Acres | |
| 6,342,010 B1 | 1/2002 | Slifer | |
| 6,350,199 B1 | 2/2002 | Williams et al. | |
| 6,358,150 B1 | 3/2002 | Mir et al. | |
| 6,364,765 B1 | 4/2002 | Walker et al. | |
| 6,394,899 B1 * | 5/2002 | Walker | 463/9 |
| 6,628,939 B2 | 9/2003 | Paulsen | |
| 6,692,353 B2 | 2/2004 | Walker et al. | |
| 6,699,125 B2 | 3/2004 | Kirmse et al. | |
| 6,769,986 B2 | 8/2004 | Vancura | |
| 6,843,724 B2 | 1/2005 | Walker et al. | |
| 7,040,987 B2 | 5/2006 | Walker et al. | |
| 7,169,052 B2 | 1/2007 | Beaulieu et al. | |
| 7,240,093 B1 | 7/2007 | Danieli et al. | |
| 7,311,608 B1 | 12/2007 | Danieli et al. | |
| 7,458,894 B2 | 12/2008 | Danieli et al. | |
| 7,938,727 B1 | 5/2011 | Konkle | |
| 8,167,712 B2 | 5/2012 | Sarkar et al. | |
| 8,974,289 B2 | 3/2015 | Allen et al. | |
| 2002/0042296 A1 * | 4/2002 | Walker et al. | 463/23 |
| 2002/0090985 A1 * | 7/2002 | Tochner et al. | 463/1 |
| 2002/0111209 A1 * | 8/2002 | Walker et al. | 463/25 |
| 2002/0142846 A1 | 10/2002 | Paulsen | |
| 2002/0183105 A1 | 12/2002 | Cannon et al. | |
| 2003/0003988 A1 | 1/2003 | Walker et al. | |
| 2003/0224852 A1 * | 12/2003 | Walker et al. | 463/20 |
| 2004/0180712 A1 | 9/2004 | Forman et al. | |
| 2005/0043092 A1 | 2/2005 | Gauselmann | |
| 2005/0054438 A1 | 3/2005 | Rothschild et al. | |
| 2005/0071481 A1 | 3/2005 | Danieli | |
| 2005/0170890 A1 | 8/2005 | Rowe et al. | |
| 2005/0209001 A1 | 9/2005 | Moshal | |
| 2005/0277469 A1 | 12/2005 | Pryzby et al. | |
| 2005/0289056 A1 | 12/2005 | Guinn | |
| 2006/0247039 A1 | 11/2006 | Lerner et al. | |
| 2006/0264257 A1 | 11/2006 | Jaffe et al. | |
| 2006/0271959 A1 | 11/2006 | Jacoby et al. | |
| 2007/0015584 A1 | 1/2007 | Frenkel | |
| 2007/0054728 A1 | 3/2007 | Hood | |
| 2007/0060380 A1 | 3/2007 | McMonigle et al. | |
| 2007/0072677 A1 | 3/2007 | Lavoie et al. | |
| 2007/0155507 A1 | 7/2007 | Gatto et al. | |
| 2008/0009344 A1 | 1/2008 | Graham et al. | |
| 2008/0102916 A1 | 5/2008 | Kovacs et al. | |
| 2008/0214308 A1 * | 9/2008 | Lyons et al. | 463/42 |
| 2009/0117989 A1 | 5/2009 | Arezina et al. | |
| 2010/0203963 A1 | 8/2010 | Allen et al. | |
| 2011/0092275 A1 | 4/2011 | Gagner et al. | |
| 2013/0150150 A1 | 6/2013 | Allen et al. | |

OTHER PUBLICATIONS

"PCT Application No. PCT/US08/88381 International Search Report", Feb. 24, 2009, 10 pages.
"PCT Application No. PCT/US08/77310 International Preliminary Report on Patentability", Sep. 14, 2010, 4 pages.
"PCT Application No. PCT/US08/77310 International Preliminary Report on Patentability", Apr. 1, 2010, 6 pages.
"PCT Application No. PCT/US08/77310 International Search Report", Dec. 8, 2008, 7 pages.
"U.S. Appl. No. 12/678,206 Office Action", Mar. 30, 2012, 21 pages.
Prizehearts, LLC, , "Lotto Love and Pals Available Next Generation Keno/Lottery Software", *24-7 Press Release* Apr. 5, 2006, 2 pages.
U.S. Appl. No. 13/707,222, filed Dec. 17, 2012, Allen, Jeffrey L., et al.
"U.S. Appl. No. 13/717,222 Office Action", Mar. 17, 2014, 8 Pages.
"U.S. Appl. No. 13/717,222 Final Office Action," Jul. 7, 2014, 6 Pages.

* cited by examiner

GROUP GAMES AND REWARDS IN WAGERING SYSTEMS

RELATED APPLICATIONS

This application claims the priority benefit of U.S. Provisional Application Ser. No. 61/017,003 filed Dec. 27, 2007.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

BACKGROUND

1. Technical Field

Embodiments of the inventive subject matter relate generally to social networks systems, and more particularly to devices and processes that determine and assign rewards as a group in a wagering game system utilizing social contacts.

2. Background Art

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises: determining a first player account associated with a wagering game; presenting the wagering game; determining a second player account that is associated with the first player account as a social network contact; determining a reward associated with the wagering game, the reward to be assigned to any one of the first player account and the second player account; determining one or more tasks that must be performed before assigning the reward; presenting the one or more tasks to the first player account and the second player account; determining that the one or more tasks have been completed by any one of the first player account and the second player account; and assigning the reward to any one of the first player account and the second player accounts.

In some embodiments, the second player account is referenced in the first player account by one or more social contact identifiers belonging to the second player account.

In some embodiments, determining the second player account comprising presenting the one or more social contact identifiers during the wagering game to indicate that the second player account is eligible to perform the one or more tasks.

In some embodiments, the method further comprises presenting one or more options to the first player account to determine any one or more of the second player account, task types and reward types.

In some embodiments, presenting the one or more tasks comprises presenting the one or more tasks during the wagering game.

In some embodiments, the method further comprises presenting completion statistics of the one or more tasks in any one of the first player account and the second player account.

In some embodiments, assigning the reward comprises proportioning the reward amongst the first player account and the second player account based on a percentage of the one or more tasks respectively completed by the first player account or the second player account.

In some embodiments, the method further comprises determining the second player account based on any one or more of past group game performance of the second player account, similarities to preferences between the first player account and the second player account, similarities to game play history between the first player account and the second player account, and a login locality of the second player account.

In some embodiments, a network comprises a machine configured to present a wagering game, wherein the wagering game is associated with a first player account; a wagering game server configured to determine and integrate a social contact identifier, from a second player account, into the wagering game, wherein the second player account is associated with the first player account as a social network contact; and a reward server comprising, a reward generator configured to determine a reward associated with the wagering game, the reward to be assigned to any one of the first player account and the second player accounts; a task generator configured to determine one or more tasks that must be performed before assigning the reward and to present the one or more tasks to the first player account and the second player account; a task completion tracker configured to determine that the one or more tasks have been completed by any one of the first player account and the second player account; and a reward distributor configured to assign the reward to any one of the first player account and the second player accounts.

In some embodiments, the wagering game server communicates with the reward server to present, on the machine, any one or more of the social contact identifier, instructions regarding the one or more tasks, and instructions regarding the reward.

In some embodiments, the machine comprises a task detection unit configured to detect completion of the one or more tasks, and wherein the wagering game server is configured to convey task completion information from the machine to the reward server.

In some embodiments, the network further comprises an account server configured to control any one of the first player account and the second player account, wherein the account server comprises an account settings store configured to store information about preferred task types and reward types; a player identity store to store identifying information about any one of the first player account and the second player account; a social contact identity store configured to store information about social contacts related to any one of the first a player account and the second player account; and a player location unit configured to determine a geographical location of the machine associated with the first player account.

In some embodiments, one or more machine-readable media having instructions stored thereon, which when executed by a set of one or more processors causes the set of one or more processors to perform operations that comprise: determining a first player account associated with a wagering game; determining a second player account that is associated with the first player account as a social network contact; determining a reward associated with the wagering game, the reward to be assigned to any one of the first player account and the second player account; determining one or more tasks that must be performed before assigning the reward; presenting the one or more tasks to the first player account and the second player account; determining that the one or more tasks have been completed by any one of the first player account and the second player account; and assigning the reward to any one of the first player account and the second player accounts.

In some embodiments, the second player account is referenced in the first player account by one or more social contact identifiers belonging to the second player account.

In some embodiments, the operation of determining the second player account comprises presenting the one or more social contact identifiers during the wagering game to indicate that the second player account is eligible to perform the one or more tasks.

In some embodiments, the operations further comprise presenting one or more options to the first player account to determine any one or more of the second player account, task types and reward types.

In some embodiments, the operation for presenting the one or more tasks further comprises presenting the one or more tasks during the wagering game.

In some embodiments, the operations further comprise presenting completion statistics of the one or more tasks in any one of the first player account and the second player account.

In some embodiments, the assigning operation comprises proportioning the reward amongst the first player account and the second player account based on a percentage of the one or more tasks respectively completed by the first player account or the second player account.

In some embodiments, the operations further comprise presenting any one or more of a group reward indicator, a group member display, a task display, and a reward display.

BRIEF DESCRIPTION OF THE DRAWING(S)

Embodiments of the invention are illustrated in the Figures of the accompanying drawings in which.

DESCRIPTION OF ILLUSTRATIVE EMBODIMENTS

This description of the embodiments is divided into six sections. The first section provides an introduction to embodiments of the invention, while the second section describes example operating environments. The third section describes example operations performed by some embodiments, while the fourth section describes additional example embodiments. The fifth section describes additional example operating environments, while the sixth section presents some general comments.

Introduction

This section provides an introduction to some embodiments of the invention.

Wagering games are expanding in popularity. Many gamers are demanding greater access to wagering games and content related to wagering games. As a result, some wagering game companies have created social network sites that provide a way for wagering game enthusiasts to congregate and share their passion for wagering games.

Figure 1:
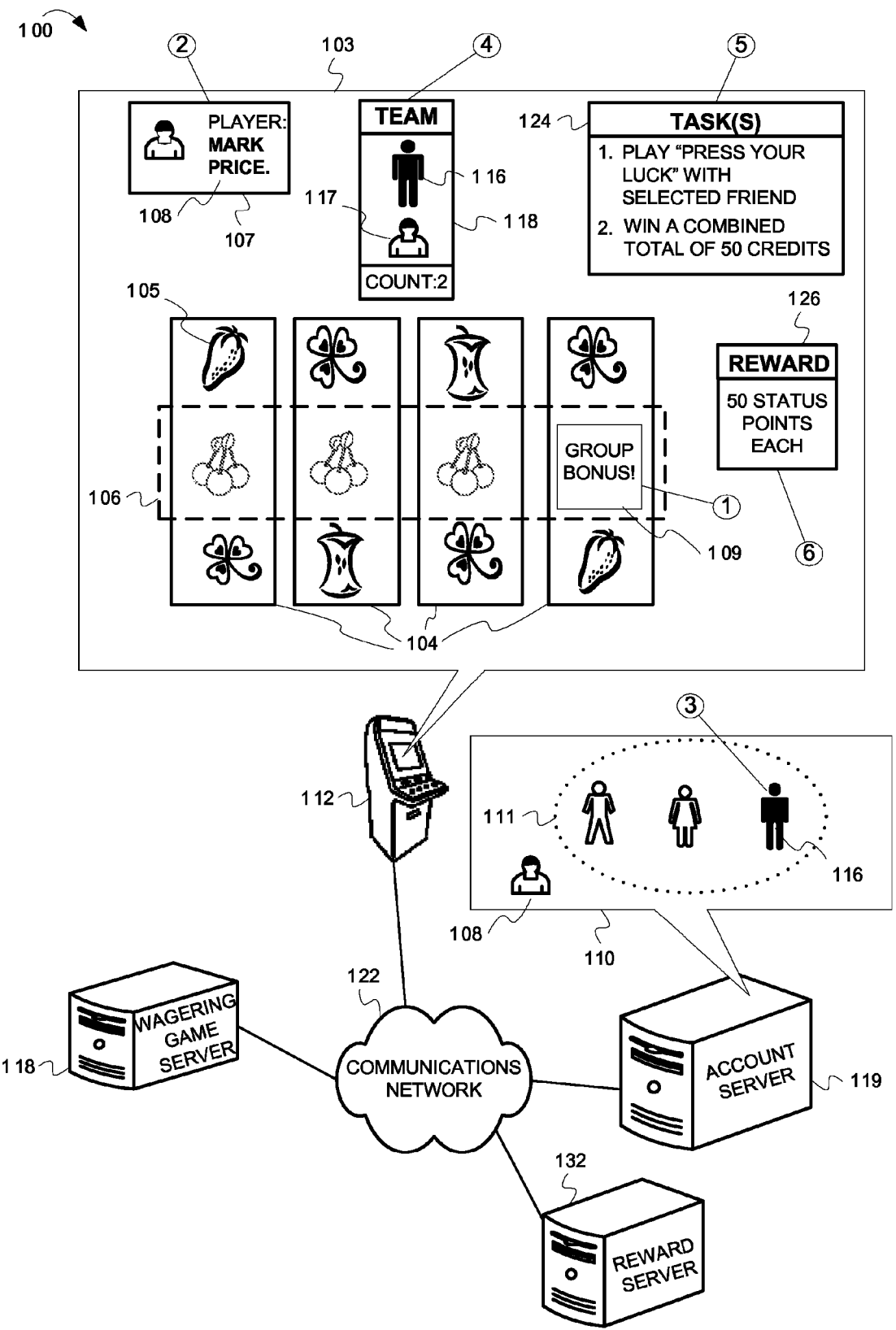
FIG. 1 is an illustration of determining and assigning rewards as a group in a wagering game system utilizing social contacts, according to some embodiments of the invention.

A social network site allows social network users to create online personas. The social network site allows users to create user accounts with one or more unique identifiers, like avatars or screen names, which represent the online persona. Furthermore, the social network user accounts allow a user to associate social contacts, like friends or acquaintances, with the account. These online personas and social contacts add to the fun of belonging to a social network. Hence, embodiments of the invention enable wagering game companies to combine the fun of social networks with the enjoyment and excitement derived from playing wagering games. FIG. 1 shows how a wagering game system integrates with user accounts and utilizes social contacts in connection with a wagering game.

FIG. 1 is an illustration of determining and assigning rewards as a group in a wagering game system utilizing social contacts, according to some embodiments of the invention. In FIG. 1, a wagering game system 100 is depicted. The wagering game system 100 includes a wagering game device 112 connected to a communications network 122. Also connected to the communications network 122 are an account server 119, a wagering game server 118, and a reward server 132. The wagering game device 112 includes a display 103 configured to present a wagering game. One example of a wagering game is a slots game, which includes reels 104. The reels 104 include various game play elements 105, like icons, or images, that line up in a specific configuration, such as a in a row 106. The wagering game device can present an outcome using the elements 105 in the row 106. The display 103 can also include a graphic 107 to indicate player identification information 108 related to a current player of the wagering game. The player of the wagering game could login to the communications network 122 using login information, a player id card, or other credentials. During the wagering game, the wagering game server 118 can provide the content for the wagering game, including the reels 104 and the game play elements 105, as well as functionality or control elements necessary to run the wagering game, such as random numbers, game outcomes, payout calculations, etc. The account server 119 can store and track the player information 108, such as identifying information (e.g., avatars, screen name, account id numbers, etc.) or other information like financial account information, social contact information, etc.

The wagering game system 100, in stage "1", presents a group reward indicator 109. The group reward indicator 109 indicates that a group reward is available for completing a group game or challenge. The group reward indicator 109 can appear in a variety of ways. One way is to appear as a game play element within the reels 104. When the group reward indicator 109 appears during the wagering game, a group reward can be obtained. The wagering game system 100, therefore, determines group reward data such as the following three items: (1) group members to participate in the group game, (2) tasks for the group members to perform, and (3) one or more rewards for the group members to obtain by performing the tasks. The description of stages "2" through "6" below will describe how the wagering game system 100 determines the three items mentioned above.

The wagering game system 100, in stage "2", determines the current player of the wagering game. The wagering game system 100 can determine the current player from the player identification information 108. The wagering game system 100 searches the account server 119, using the player identification information 108, to find the account 110 for the current player. Within the account 110 will be a listing 111 of social contact identifiers 116 that identify social contacts associated with the account 110. The social contacts can be friends, acquaintances, business associates, or other individuals that the current player has listed in the account 110. In some embodiments, the social contact identifiers 116 can also represent social contacts that the wagering game system 100 assigns to the account 110 as social contacts. In some embodiments, social contact identifiers 116 may be groups of social contacts. The social contact identifiers 116 are references to accounts belonging to the social contacts on the account server 119.

The wagering game system 100, in stage "3", chooses one or more of the social contact identifiers 116 to be group game members. The wagering game system 100 can choose the social contact identifiers 116 randomly. In other embodiments, however, the wagering game system 100 could utilize input provided by the current wagering game player to choose the social contact identifiers 116 (e.g., the wagering game player could hand-select the group members). Input from the wagering game player could include settings, preferences or options provided by the wagering game player. The settings, preferences or options could be set during the wagering game or outside of the wagering game and stored in the player's account 110.

The wagering game system 100, in stage "4", presents the social contact identifiers 116 of the selected group game members in a group member display 118. The group member display 118 displays the one or more social contact identifiers 116. The group member display can also display an avatar 117, or similar indicator, that identifies the current player as a member of the group. The social contact identifiers 116 and the avatar 117 within the group member display 118 represent a group of user accounts that can compete or collaborate to obtain a reward by completing a series of tasks. The group member display 118 can dynamically present a group member count or other information about the group statistics (e.g., present statistics on a growing group count in real-time as group members accept invitations to be in the group.)

In stage "5", the wagering game system 100, generates the series of tasks and presents them in a task display 124. In the example shown in FIG. 1, the wagering game system 100 chooses a "collaborative" set of tasks, or rather, a set of tasks that the team performs together to obtain a reward. Alternatively, the wagering game system 100 could have created a set of "competitive" tasks, or rather tasks that the group members could perform in a competitive manner. Additionally, the wagering game system 100 could have created a combination of collaborative and competitive tasks.

The wagering game system 100, in stage "6", also determines the reward(s) that the group members can obtain. The reward(s) are presented on the wagering game device 112 in a reward display 126. Once the group members complete the tasks, the wagering game system 100 can assign the reward to accounts associated with the group members shown in the group member display 118. The account server 119 can contain the accounts for the social contacts and the player. Consequently, the wagering game system 100 can access the accounts and assign the reward to the accounts. In some embodiments, some rewards may be determined and assigned only to group members that perform tasks on behalf of the group, or that perform a greater amount, or higher difficulty, of tasks than others in the group.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures and wagering game networks.

Example Wagering Game System Architecture

Figure 2:
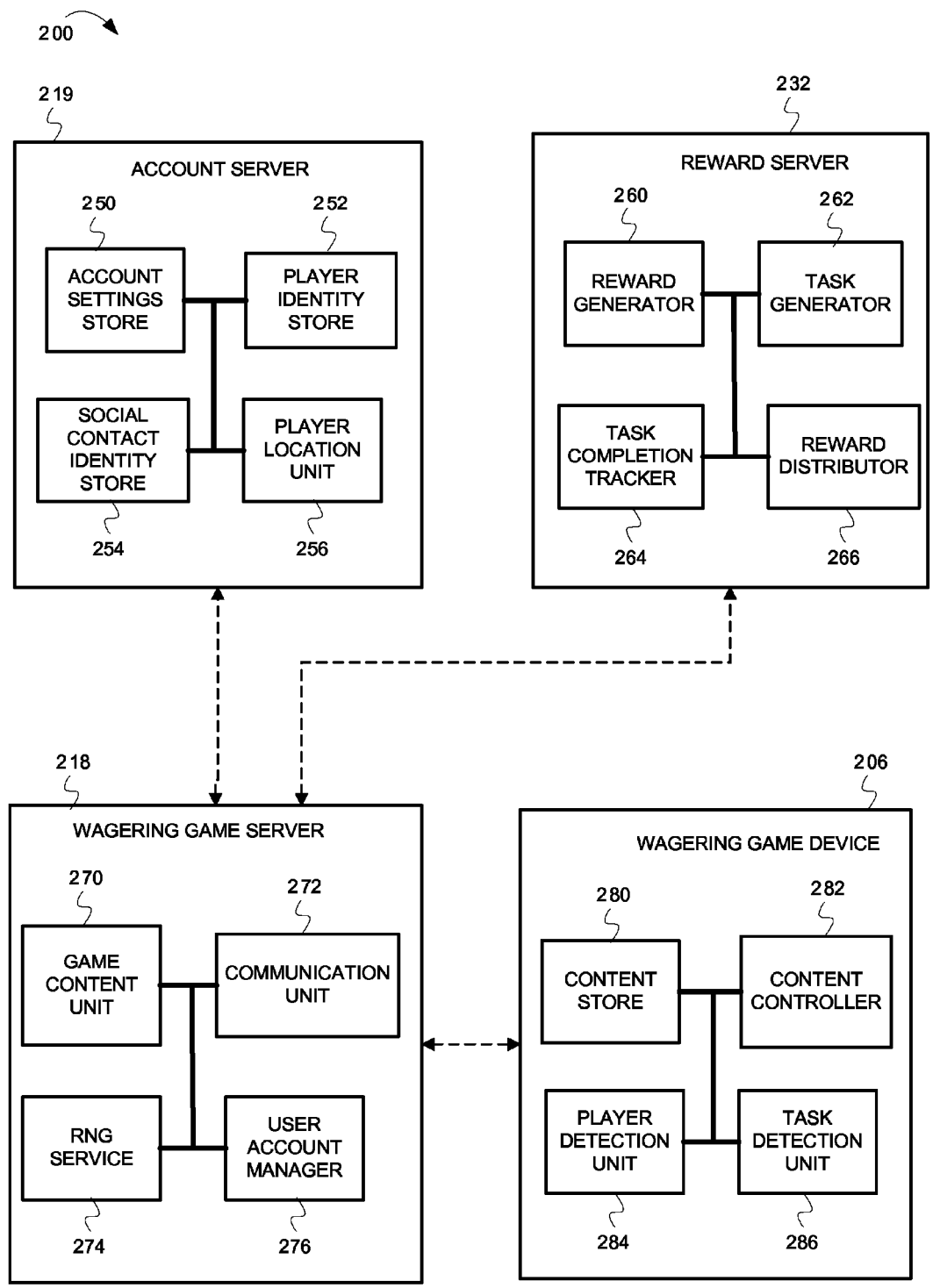
FIG. 2 is an illustration of a wagering game system architecture 200, according to some embodiments of the invention.

FIG. 2 is an illustration of a wagering game system architecture 200, according to some embodiments of the invention. In FIG. 2, the wagering game system architecture 200 can include an account server 219 configured to control user related accounts accessible via wagering game networks and social networks. The account server 219 can include an account settings store 250 configured to store information about settings for a user account. The account server 219 also can include a player identity store 252 configured to store identifying information about a user account. The account server 219 also can include a social contact identity store 254 configured to store information about social contacts related to a user account. The account server 219 also can include a player location unit 256 configured to determine the geographic location of a device that a wagering game player has logged-in to.

The wagering game system architecture 200 also can include a reward server 232 configured to determine and assign tasks and rewards to groups and to track completion of events and assignments in a wagering game network. The reward server 232 can include a reward generator 260 configured to determine a reward to assign to a group of game members ("group members") comprising a wagering game player account and one or more associated social contact accounts. The reward server 232 also can include a task generator 262 configured to determine one or more tasks to assign to the group members to perform to obtain the reward. The reward server 232 also can include a task completion tracker 264 configured to track the completion of the tasks by the group members. The reward server 232 also can include a reward distributor 266 configured to determine the distribution of the reward according to various factors such as a number of group members, specific accomplishments completed by individual group members, etc.

The wagering game system architecture 200 also can include a wagering game server 218 configured to control wagering game content and communicate wagering game information, account information, and reward information to and from a wagering game device 206. The wagering game server 218 can include a game content unit 270 configured to contain content to present on the wagering game device 206. The wagering game server 218 also can include a communication unit 272 configured to communicate information to the wagering game device 206 and to communicate with other systems, devices and networks, such as the reward server 232, the account server 219, community servers, etc. The wagering game server 218 also can include a random number generator (RNG) service 274 configured to generate random numbers for use with wagering games, rewards, and other wagering game related content. The wagering game server 218 also can include a user account manager 276 configured to control information related to user accounts, social contact identifiers, task completion information, user notifications, etc.

The wagering game system architecture 200 also can include the wagering game device 206 configured to present wagering games and receive and transmit information related to rewards and completion of tasks related to group rewards. The wagering game device 206 can include a content store 280 configured to store content related to wagering games and group rewards. The wagering game device 206 also can include a content controller 282 configured to manage and control content and presentation of content on the wagering game device hardware. The wagering game device 206 also can include a player detection unit 284 configured to determine identifying information about a user of the wagering game device that is playing a wagering game. The wagering game device 206 also can include a task detection unit 286 configured to detect completion of tasks related to rewards for a group. In some embodiments the player detection unit 284 or the task detection unit 286 can also be in the wagering game server 218.

Each component shown in the wagering game system architecture 200 is shown as a separate and distinct element. However, some functions performed by one component could be performed by other components. For example, the wagering game server 218 or the account server 219 could also track tasks and rewards. Furthermore, the components shown may all be contained in the wagering game system 200, but some, or all, may be included in, or performed by, other devices on connected systems and networks. Furthermore, the wagering game system architecture 200 can be implemented as software, hardware, any combination thereof, or other forms of embodiments not listed.

Example Wagering Game Network

Figure 3:
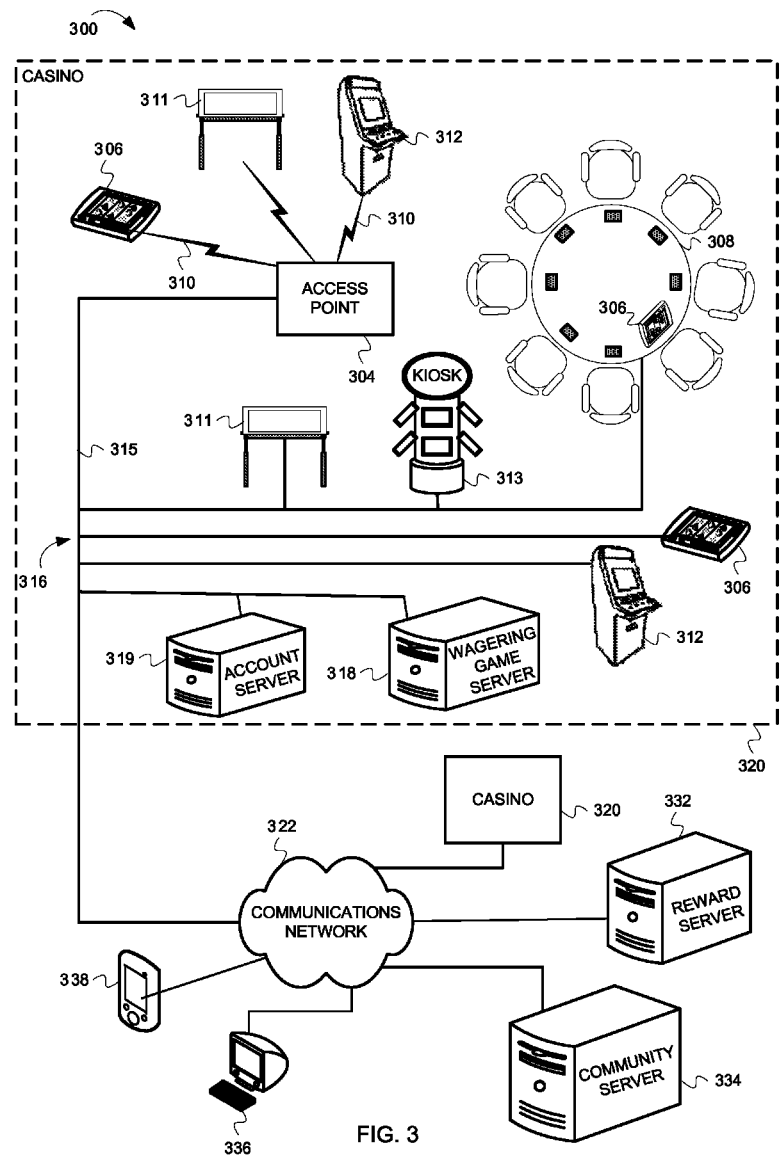
FIG. 3 is an illustration of a wagering game network 300, according to some embodiments of the invention.

FIG. 3 is an illustration of a wagering game network 300, according to some embodiments of the invention. In FIG. 3, the wagering game network 300 includes a plurality of casinos 320 connected to a communications network 322. Each casino 320 includes a local area network 316, which includes an access point 304, one or more servers 318, 319, and wagering game machines 306, 311, 312. In one embodiment, the local area network 316 includes specific types of servers such as a wagering game server 318 and an account server 319, or other servers not shown herein, such as promotions servers, player information servers, management servers, progressive servers, player tracking servers, file servers, web servers, application servers, database servers, and other casino and player account servers. There are many other devices, in other embodiments, that are not shown but that may exist in a wagering game network (e.g., routers, switches, monitoring equipment, etc.). The access point 304 provides wireless communication links 310 with wagering game machines 306, 311, 312. The local area network 316 may also include wired communication links 315 to connect to servers 318, 319, wireless access point 304, wagering game machines 306, 311, 312, one or more docking stations 308 and one or more kiosks 313 for storing mobile wagering game machines. The wired and wireless communication links can employ any suitable connection technology, such as Bluetooth, 801.11, Ethernet, public switched telephone networks, SONET, etc. In some embodiments, the wagering game server 318 can serve wagering games and distribute content to devices located in other casinos 320 or at other locations on the communications network 322.

The wagering game machines 306, 311, 312 described herein can take any suitable form, such as floor standing models (e.g., 312), handheld mobile units (e.g., 306), bar-top models, workstation-type console models, surface computing machines (e.g., 311), etc. Further, the wagering game machines 306, 311, 312 can be primarily dedicated for use in conducting wagering games, or can include non-dedicated devices, such as mobile phones, personal digital assistants, personal computers, etc.

In some embodiments, wagering game machines 306, 311, 312 and the wagering game server 318 work together such that wagering game machines 306, 311, 312 can be operated as a thin, thick, or intermediate client. For example, one or more elements of game play may be controlled by the wagering game machines 306, 311, 312 (client) or the wagering game server 318 (server). Game play elements can include executable game code, lookup tables, configuration files, game outcomes, audio or visual representations of the game, game assets or the like. In a thin-client example, the wagering game server 318 can perform functions such as determining game outcome or managing assets, while the wagering game machines 306, 311, 312 can present a graphical representation of such outcome or asset modification to the user (e.g., player). In a thick-client example, the wagering game machines 306, 311, 312 can determine game outcomes and communicate the outcomes to the wagering game server 318 for recording or managing a player's account.

In some embodiments, either the wagering game machines 306, 311, 312 (client) or the wagering game server 318 can provide functionality that is not directly related to game play. For example, account transactions and account rules may be managed centrally (e.g., by the wagering game server 318) or locally (e.g., by the wagering game machines 306, 311, 312). Other functionality not directly related to game play may include power management, presentation of advertising, software or firmware updates, system quality or security checks, community management, real-time messaging, etc.

The wagering game network 300 can determine and assign rewards as a group by utilizing social contacts. For example, the wagering game network 300 can work in conjunction with the account server 319, a reward server 332, a community server 334, the wagering game server 318, wagering game devices 306, 311, 312, or other devices, like a computer 336 or a mobile device 338. The wagering game network 300 may interact with any suitable wagering game network component to assign a player account and associated social contact accounts as group members of a group game or challenge. The wagering game network 300 can then determine and assign tasks to the group members to complete for the group game or challenge. The wagering game network 300 tracks completion of the tasks and assigns a reward to the group members.

Any of the wagering game network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments of the invention. In the discussion below, some flow diagrams are described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 4:
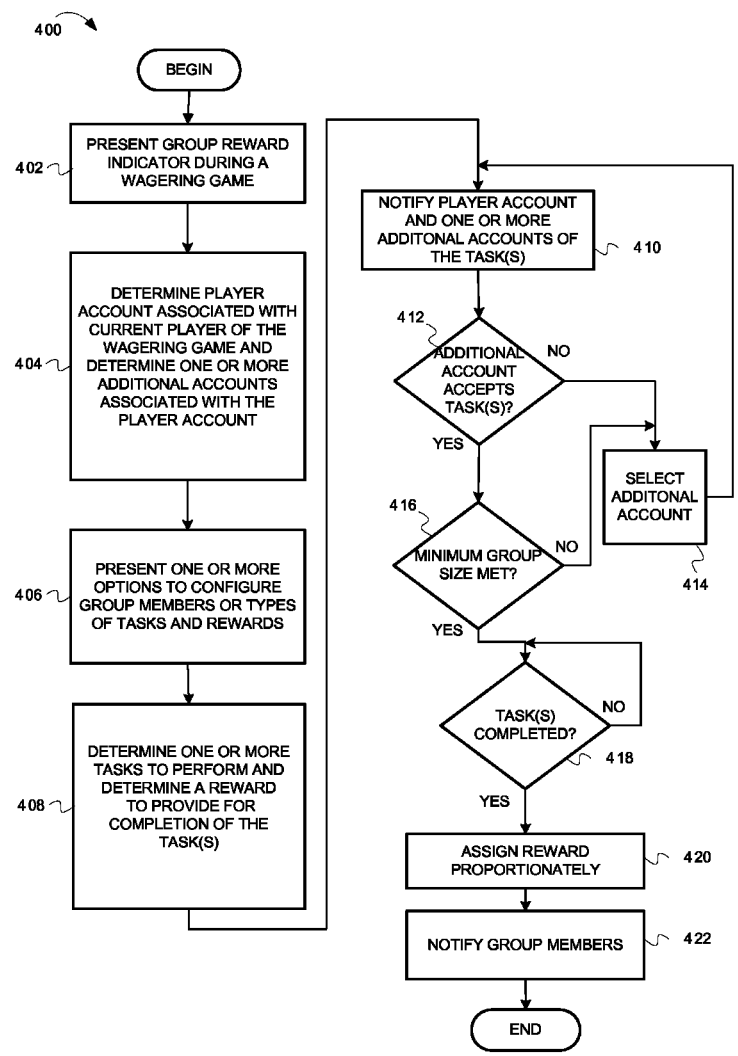
FIG. 4 is a flow diagram 400 illustrating determining group rewards, tasks and group members from social contacts of a wagering game player, according to some embodiments of the invention.
Figure 5:
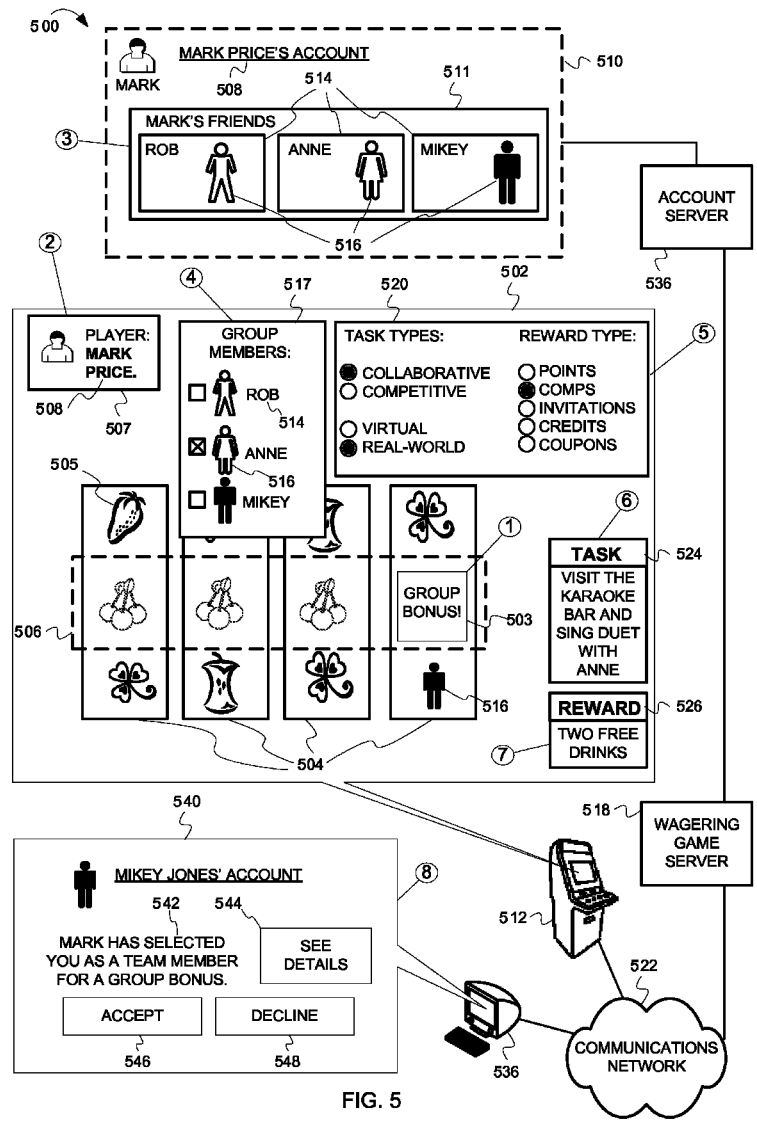
FIG. 5 is an illustration of determining group rewards, tasks and group members from social contacts of a wagering game player, according to some embodiments of the invention.

FIG. 4 is a flow diagram illustrating determining group rewards, tasks and group members from social contacts of a wagering game player, according to some embodiments of the invention. FIG. 5 illustrates a wagering game system 500 configured to determine group rewards, tasks and group members from social contacts of a wagering game player. This description will present FIG. 4 in concert with FIG. 5. In FIG. 4, the flow 400 begins at processing block 402, where a wagering game system presents a group reward indicator during a wagering game. In FIG. 5 at stage "1", the wagering game system 500 presents a group reward indicator 503 as part of a wagering game. The wagering game is presented on a wagering game device display 502. The wagering game may be one or various types of wagering games, such as a slots game with reels 504 and game play elements 505 that line up in a game outcome row 506 to determine a game outcome. The group reward indicator 503 can be part of the game outcome row 506, or can be presented elsewhere, such as in a bonus display outside of the reels 504 or on attached peripheral devices and displays. In some embodiments, a wagering game server 518 presents the group reward indicator 503 on the wagering game device 512. In other embodiments, the wagering game server 518 presents the group reward indicator 503 on devices connected to the wagering game device 512, such as a docking station display. The group reward indicator 503 is depicted as being a visual indicator, but could also be an audio indicator or a combination of both audio and visual elements.

The flow 400 continues at processing block 404, where the wagering game system determines a player account associated with the current player of the wagering game. The wagering game system also determines one or more additional accounts of social contacts associated with the player account. In some embodiments, the wagering game system can also determine one or more additional accounts not associated with the player account (e.g. the system assigns new social contacts for the player to work with.) In FIG. 5 at stage "2", the wagering game system 500 determines game player identification information 508 presented in a player information display 507. The wagering game server 518 communicates with an account server 536 and uses the player identification information 508 to find and access a player account 510 associated with the current player of the wagering game. The player account 510 is stored on the account server 536. The player account 510 contains the player identification information 508 that identifies the player. The player account 510 also includes one or more social contacts 514 listed in a social contacts display 511. The information in the social contacts display 511 could be stored on a database record associated with the player account. The database record could include references to social network accounts for the social contacts 514. The social network accounts could be on the account server 536 or on other servers not shown, like a community server or a web server. Thus, in stage "3", the wagering game system determines one or more of the accounts for the social contacts 514 associated with the player account 510. The wagering game system 500 presents identifying information about the social contacts, such as social contact indicators 516 that represent the social contacts' accounts. In some embodiments, the wagering game system 500 presents the social contact indicators 516 as part of the game play elements 505 to indicate who the group members are (e.g., group members consist of the player account and the accounts of all social contacts whose social contact indicators show on the reels 504 when the group reward indicator 503 appears). In some embodiments, the wagering game system 500 presents the social contact indicators 516 in a group members display 517 separate from the wagering game play elements 505 or the reels 504. The group member display 517 can include identifying information 514 about the social contacts, like names and social contact indicators 516.

The flow 400 continues at processing block 406, where the wagering game system presents one or more options to configure group members or types of tasks and rewards. In FIG. 5 at stage "4" the wagering game system 500 presents one or more options to configure group members, such as the ability to choose group members or the ability to provide input about types of group members. In some embodiments, the wagering game system 500 could automatically choose a number of group members and select the group members for the player. However, in some embodiments, the wagering game system 500 presents the option to select a number of group members, or even to select specific group members from the social contacts 514. There could be benefits to allowing a player to select group members. For instance, selecting a larger number of group members could increase a player's chances of completing the bonus tasks or activities. At the same time, however, there could be a counter effect set by the wagering game system 500 to make the group challenge more interesting and to encourage smaller group sizes. For instance, the wagering game system 500 could spread out payouts of the group reward proportional to the number of group members selected. Thus, part of the fun and challenge of the group reward could be presenting the options for the player to "right size" the group, or to specifically select group members that are skilled at performing certain tasks. In some embodiments, the wagering game system 500 presents the group member display 517, and any options provided in the group member display screen 517, in a way that overlaps portions of the wagering game display. For example the group member display 517 could overlap onto less important portions of the reels 504, such as portions of the reels 504 that do not display the game outcome row 506. In other embodiments, the reels 504 could shrink to provide space to present the group member display 517 or other options and displays related to group rewards. In stage "5", similar to presenting options for selecting group members in stage "4", the wagering game system 500 also presents options for determining task types or reward types. Although the wagering game system 500 could determine tasks and rewards automatically, without user input, in some embodiments, the wagering game system 500 presents the player with options so that the player might increase the chances of obtaining a specific type of reward or completing a specific type of task. The wagering game system 500 presents the options in a task and reward options display 520. The task and reward options display 520 could include options for selecting whether the tasks are collaborative or competitive, or if the tasks are virtual (e.g., computer related tasks) or real world tasks (e.g., performing physical tasks like singing a song at the karaoke bar, signing up for a poker tournament, etc.) The task and reward options display 520 could also provide options for selecting the type of reward (e.g., points, comps, invitations, credits, coupons, etc.) In FIG. 5, the options are presented on the wagering game device display 502. In other embodiments, however, the options could be presented in secondary displays, like on attached monitors or devices. In yet other embodiments, the options could be presented as part of the player account 510. A setting on the player's account 510 could indicate where and how to show group game options, if the wagering game system 500 provides options.

The flow 400 continues at processing block 408, where the wagering game system determines one or more tasks to perform and determines a reward to provide for completion of the one or more tasks. In FIG. 5 at stage "6", the wagering game system 500 determines one or more tasks, or activities, for the group members to complete. The wagering game system 500 presents the tasks, or rather instructions and/or information regarding the tasks, in a tasks display 524. The wagering game system 500 generates the tasks in various ways. For example, the wagering game system 500 could read the options selected in the tasks and rewards options display 520 and, based on the options, determine one or more tasks. The wagering game system 500 could refer to a cue or listing of information that reflects current advertising needs on the wagering game network. For example, if a casino introduces a new game or service to the casino, the casino could enter the new game or service into the information cue or listing. The wagering game system 500 could read from the listing and generate a set of tasks that involve participation with the new game or service. In stage "7", the wagering game system 500 determines a reward to present to the group members for completing the one or more tasks. The wagering game system 500 presents the reward, or rather instructions and/or information regarding the reward, in a rewards display 526. The wagering game system 500 can determine the reward based on options, settings, user preferences, or other information available on the network. For example, the wagering game system 500 could read the player's account information and determine likes and dislikes of the current player, then determine a reward based on the player's listed likes. In another example, the wagering game system 500 could determine player account information as filters for selecting team members (e.g., finds similar players based on criteria like game favorites, playing habits (e.g., time of day), playing style, non-game specific metadata about the player (e.g., favorite sports team, favorite celebrity, occupation, astrological sign, age, gender, etc.)

The flow 400 continues at processing block 410, where the wagering game system notifies the player account and the one or more additional accounts of the one or more tasks. In FIG. 5 at stage "8", the wagering game system 500 accesses the player account 510 and the accounts of the one or more social contacts selected as group members. The one or more social contacts can access their respective social network accounts, such as account 540, using various devices that can access a communications network 522, such as a computer 536, a wagering game device 512, a hand-held or mobile device, etc. In some embodiments, the wagering game system 500 notifies the social contact account 540 of the one or more tasks by presenting information 544 about the group members, tasks, or reward. Further, the information includes an invitation 542 to participate in the group challenge. The social contact account 540 presents options for accepting or rejecting the invitation, such as buttons 546, 548 respectively.

The flow 400 continues at processing block 412, where the wagering game system determines whether the one or more additional accounts accept the challenge to complete the one or more tasks. If the one or more additional accounts do not accept the group challenge to perform the tasks, then the process continues at block 414. For example, the wagering game system could select additional social contacts associated with the wagering game player's account. The flow 400 returns to processing block 410 to notify the additional social network accounts. In some embodiments, the flow 400, at block 410, may have notified the player account on the first pass through the flow 400, whereas on subsequent passes, the flow 400, at block 410, need not notify the player account if a social network account rejects the invitation. In other embodiments, however, the wagering game system could notify the player account of the rejection. If, however, the social contact account accepts the group challenge, then the process continues at block 416.

The flow 400 continues at processing block 416, where the wagering game system determines whether a minimum group size has been met to complete the group tasks. In some embodiments, the wagering game system may require that a minimum group size be met. For example, the wagering game system may require that more than two group members complete the tasks. If a minimum group size has been met, then the process continues at block 418. If the minimum group size has not been met, then the process returns to block 414 and repeats until a sufficient number of group members have accepted the group challenge invitations.

The flow 400 continues at processing block 418, where the wagering game system determines that the tasks have been completed. In FIG. 5, the wagering game system 500 tracks the completion of tasks with the wagering game device 512, which indicates that a task has been completed. The wagering game server 518 receives a communication from the wagering game device 512, which conveys the information from the communication to the account server 536 and/or other servers or devices not shown, like a rewards server. Referring back to FIG. 4, if all tasks have not been completed, the block 418 repeats itself. If, however, all tasks have been completed, the flow 400 continues at block 420.

The flow 400 continues at processing block 420, where the wagering game system assigns the reward proportionately. For example, the wagering game system divides the reward amongst the group member accounts. In some embodiments, the wagering game system could divide the rewards according to a number of group members. Further, the wagering game system could proportion the reward according to a proportion of tasks completed by a group member.

The flow 400 continues at processing block 422, where the wagering game system notifies group members of the assignment of the reward. In some embodiments, the wagering game system notifies the group members through their respective accounts. In other embodiments, the wagering game system notifies the group members during, or as part of, a wagering game utilizing one or more wagering game devices. In other embodiments, the wagering game system notifies group members via email, instant messages, phone messages, etc.

Figure 6:
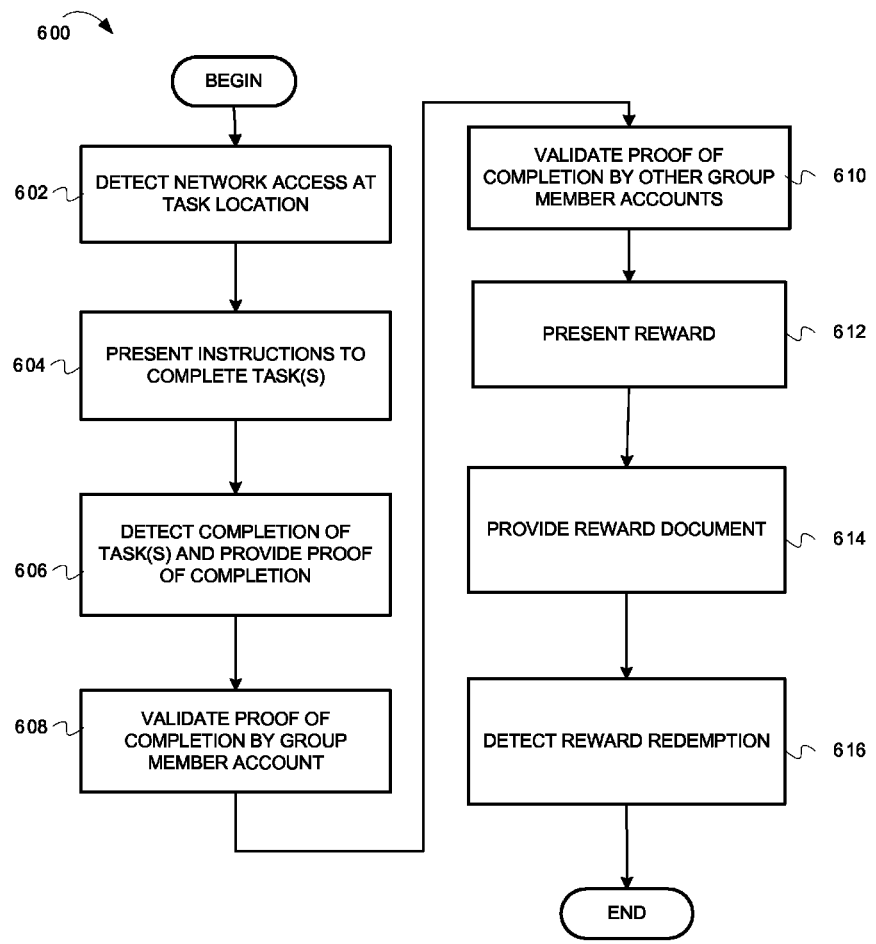
FIG. 6 is a flow diagram 600 illustrating tracking tasks for group rewards, according to some embodiments of the invention.
Figure 7:
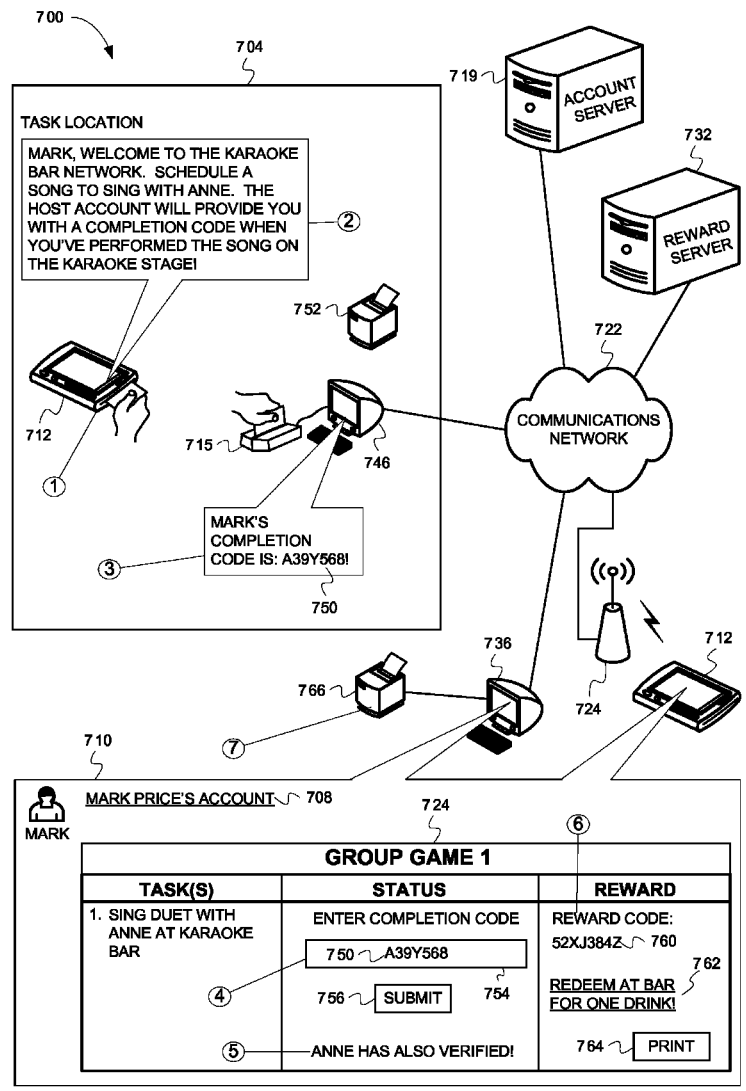
FIG. 7 is an illustration of tracking tasks for group rewards, according to some embodiments of the invention.

FIG. 6 is a flow diagram illustrating tracking tasks for group rewards, according to some embodiments of the invention. FIG. 7 illustrates tracking tasks for group rewards utilizing a wagering game system 700. This description will present FIG. 6 in concert with FIG. 7. In FIG. 6, the flow 600 begins at processing block 602, where a wagering game system detects network access at a task location. In FIG. 7 at stage "1", a group game member ("group member") can access a communications network 722 via one or more devices at a task location 704. The group member can be the player of the wagering game described in conjunction with FIGS. 4 and 5 above, or the group member can be any of the social contacts selected from the player's account. The group member could log in to a wagering game device 712 or a terminal 746. The terminal 746 could be connected to a user identification device, like a card scanner 715 which the group member utilizes by swiping an identification card. To verify that the group member player is really who they say to be, the wagering game device 712 or the terminal 746 could require a password verification that only the group member would know, like a user account password or a key code that the wagering game system 700 could have provided previously.

The flow 600 continues at processing block 604, where the wagering game system presents instructions to complete tasks. In FIG. 7 at stage "2", the wagering game system 700 notifies the group member of the task requirements on the wagering game device 712. The tasks could be identical to the tasks presented previously during the wagering game, or they could be expanded tasks, with additional information necessary for the group member to know to complete the task. In some embodiments, the instructions could relate to real-world tasks that would need to be completed beyond the wagering game device 712. A casino employee could verify the completion of the task. Otherwise, if the task is connected to a network device, the network device could detect the completion of the task.

The flow 600 continues at processing block 606, where the wagering game system detects completion of tasks and provides proof of completion. In FIG. 7 at stage 3" the wagering game system 700 provided a completion code 750 verifying the completion of the one or more tasks. In some embodiments, the wagering game system 700 could print out the completion code 750 using a printer 752. The wagering game device 712 or the terminal 746 detects the task completion and conveys the information to a reward server 732 via the communications network 722. In some embodiments, a wagering game server could assist the wagering game device 712 or terminal 746 to convey the information. A task completion tracker on the reward server 732 can store and control task completion indicators. The reward server 732 can communicate with an account server 719 to associate tasks with group member accounts. The reward server 732 updates the account server 719 with completion statistics.

The flow 600 continues at processing block 608, where the wagering game system validates proof of completion by a group member account. In FIG. 7 at stage "4", the wagering game system 700 provides access to a group member account 710. A group member can access the account 710 via a wagering game device 713. The wagering game device 713 could be a mobile device that connects to the communications network 722 via a wireless access transmitter 724. In some embodiments, the group member could also access the account 710 via a computer 736. The account 710 includes a group game display 724 that lists tasks, task status, and reward information. The account 710 includes a code verification field 754 to enter the completion code 750 and a submission button 756 to transmit the completion code 750.

The flow 600 continues at processing block 610, where the wagering game system validates proof of completion by other group member accounts. In FIG. 7 at stage "5", the wagering game system 700 determines that all group members have completed their tasks. The account 710 presents the information about task completion in the group game display 724.

The flow 600 continues at processing block 612, where the wagering game system presents a reward to the group member accounts. In FIG. 7 at stage "6", the wagering game system 710 provides a reward code 760. The account 710 displays instructions 762 to redeem the reward.

The flow 600 continues at processing block 614, where the wagering game system provides reward documentation. In FIG. 7 at stage "7", the wagering game system 700 includes a printer 766 connected to the computer 736. In other embodiments, the printer 766 could be connected directly to the communications network 722. The wagering game system 700 presents a print option 764 to print documentation, like a receipt, of the reward code 760. In some embodiments, the documentation can include a bar code or other form of electronically readable documentation that can be scanned or uploaded to the reward server 732 or other network devices.

The flow 600 continues at processing block 616, where the wagering game system detects reward redemption. In FIG. 7, once the wagering game system detects redemption of the reward, then the account server can clear out information pertaining to the group game. For example, the wagering game system 700 could clear the group game display 724 from the user account 710. The wagering game system 700 could use the group game information to determine completion statistics, and other information, which the wagering game system 700 can then use to present to any one of the group members through their respective accounts.

Figure 8:
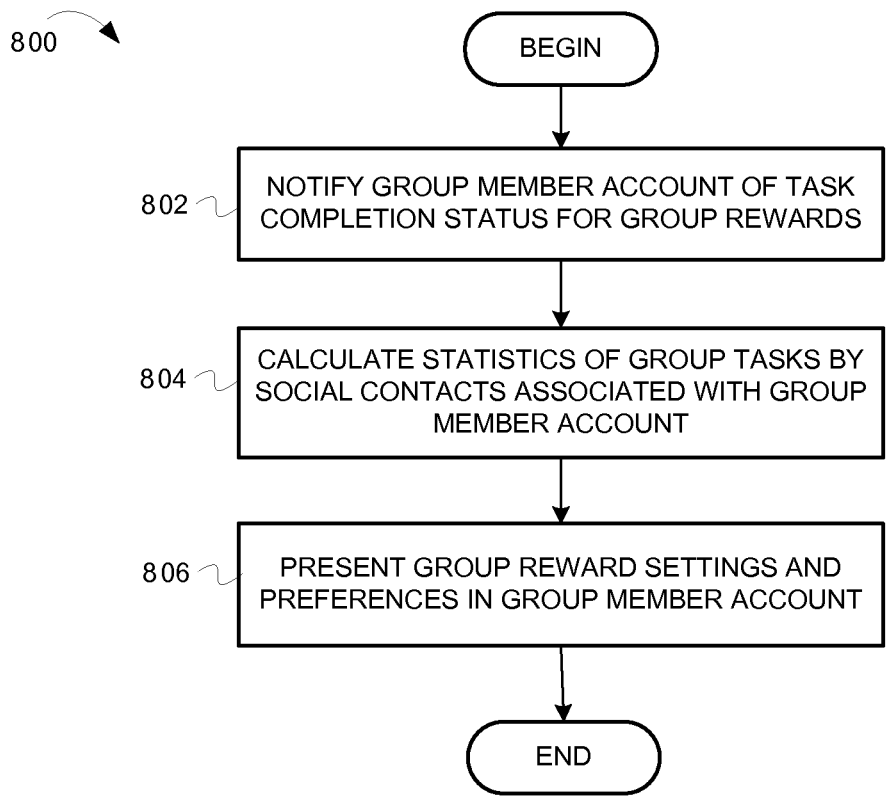
FIG. 8 is a flow diagram 800 illustrating tracking group members, rewards and tasks for group rewards with a player account, according to some embodiments of the invention.
Figure 9:
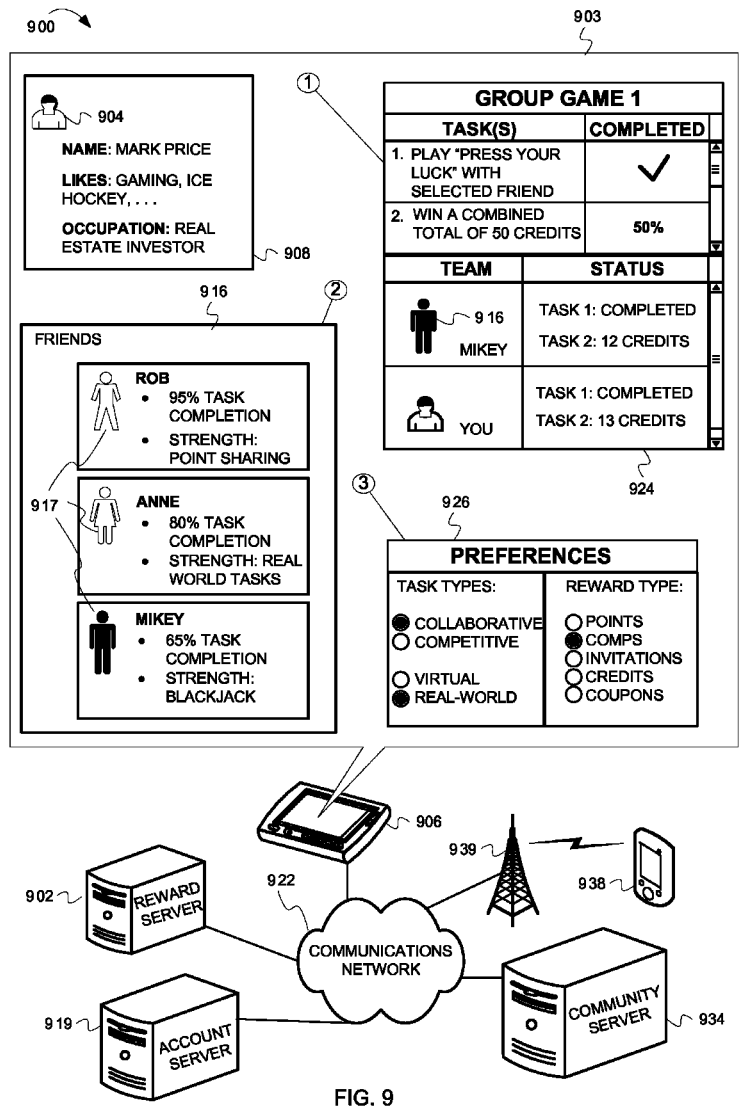
FIG. 9 is an illustration of tracking group members, rewards and tasks for group rewards with a player account, according to some embodiments of the invention.

FIG. 8 is a flow diagram illustrating tracking group members, rewards and tasks for group rewards with a player account, according to some embodiments of the invention. FIG. 9 illustrates tracking group members, rewards and tasks for group rewards with a player account, according to some embodiments of the invention. This description will present FIG. 8 in concert with FIG. 9. In FIG. 8, the flow 800 begins at processing block 802, where a wagering game system notifies a group member account of a task completion status for group rewards. FIG. 9 illustrates a wagering game system 900 that includes a wagering game device 906, a reward server 902, a community server 934, an account server 919, and a mobile device 938, all connected to a communications network 922. The mobile device 938 is connected via an antenna 939. The wagering game device 906 presents a group member account 903. The account 903 is stored on any one of the account server 919 or the community server 934. In some embodiments, the account 903 can be accessed by the mobile device 938 or other devices, such as a personal computer or other network devices. The account 903 includes identifying information 904 about a group member in a user account display 908. In FIG. 9 at stage "1", the account 903 presents a group game display 924 to display statistics and status information regarding the tasks. For instance, the group game display 924 displays completion percentages of tasks, group game members, and amounts of tasks yet to be completed. In some embodiments, the wagering game system 900 can show leader boards of groups that compete against other groups, or leader boards of group members within the group that are outperforming other group members.

The flow 800 continues at processing block 804, where the wagering game system calculates statistics of group tasks by social contacts associated with the group member account. In FIG. 9 at stage "2" the account 903 presents a social contact display 916. The social contact display 916 includes information regarding the social contacts, like social contact identifiers 917. The social contact display 916 also includes statistics about social contact accounts that have participated in group games. Statistics could include percentages about task completion or task strengths. A wagering game player can refer to these statistics when selecting one or more group members to participate in a group game. In some embodiments, the group game display 924 can display statistics on the player's own game history (e.g., past group game performances and statistics). In some embodiments, the wagering game system 900 can utilize statistics of past social contacts with group game statistics to automatically build a team (e.g., the wagering game system 900 could choose the highest rated social contacts that are online when a player gets a group game indicator in a wagering game.) In some embodiments, the wagering game system 900 could maintain a history of the last group that was formed and re-form that same group. The wagering game system 900 could show a list of top rivals (e.g. from social contacts list, from past competitions, etc.) and sort that list. The wagering game system 900 could rate users with a rating and assign rating points to players that beat a higher rated players, or remove rating points from players that lose to lower rated players.

The flow 800 continues at processing block 806, where the wagering game system presents group reward settings and preferences in the player account. In FIG. 9 at stage "3", the account 903 includes a preferences display. The account owner can set preferences, such as preferred task types or reward types. The wagering game system 900 can utilize the preferences when determining tasks and rewards to provide during a group game or challenge.

Additional Example Embodiments

According to some embodiments of the invention, a wagering game system can provide various group games, task, and rewards. The following non-exhaustive list enumerates some possible embodiments.

- Using an account to combine group efforts: some group games can allow social contact group members to utilize an account to see game pieces or items and combine them together to obtain a reward;
- Using an account to determine eligibility for group participation: a social contact identifier of a social contact from a player's account may need to appear in a wagering game for the social contact account to be eligible to participate in a group game.
- Using an account to assign competing teams: an account could provide settings and displays to select competing teams.
- Using an account to determine geographic location of group members or potential group members: the outcome of a group game could include participation of group members based on geographic location of the group members. For example, a wagering game system could assign social contacts to be group members that are located in various locations in different casinos. The location of the group members can be tracked by their login information into their social network accounts. For instance, group games may be like relay races wherein a social contact identifier must appear in a wagering game to perform a task, but the appearance of the social contact identifiers must meet a preset geographical dispersion pattern.
- Using an account to donate task completion points or credits to group members: a group member, or potential group member, could donate completed tasks, points, or credits, via their account to another account to assist another group member to complete a task.
- Using an account to side-bet on group members: non group members and group members could place side bets via wagering game accounts regarding group game tasks, such as whether group members will complete tasks, whether one group will beat another group in a competitive task, etc.
- Using an account to reward groups based on the number of people that complete tasks (e.g. 100% of the group participates, then 10× bonus, if 50% of group participates, then 5× bonus, etc.)
- Using an account to select group members strictly from certain social groups (e.g., only online friends, only offline friends, only online friends in the same location as the player, only online non-friends globally.)

Additional Example Operating Environments

This section describes example operating environments, systems and networks, and presents structural aspects of some embodiments.

Example Wagering Game Machine Architecture

Figure 10:
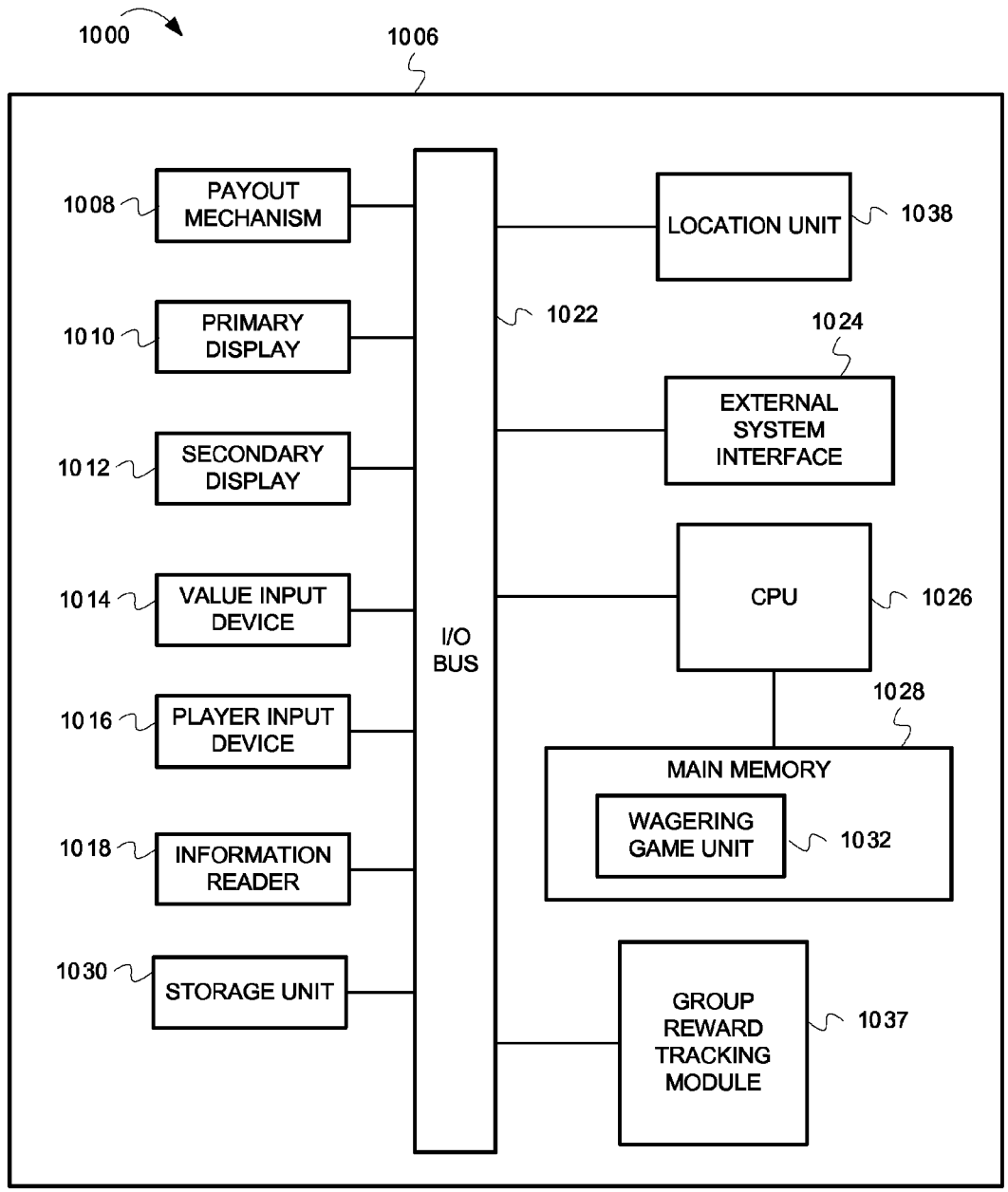
FIG. 10 is an illustration of a wagering game machine architecture 1000, according to some embodiments of the invention.

FIG. 10 is an illustration of a wagering game machine architecture 1000, according to some embodiments of the invention. In FIG. 10, the wagering game machine architecture 1000 includes a wagering game machine 1006, which includes a central processing unit (CPU) 1026 connected to main memory 1028. The CPU 1026 can include any suitable processor, such as an Intel® Pentium processor, Intel® Core 2 Duo processor, AMD Opteron™ processor, or UltraSPARC processor. The main memory 1028 includes a wagering game unit 1032. In one embodiment, the wagering game unit 1032 can present wagering games, such as video poker, video black jack, video slots, video lottery, reel slots, etc., in whole or part.

The CPU 1026 is also connected to an input/output ("I/O") bus 1022, which can include any suitable bus technologies, such as an AGTL+ frontside bus and a PCI backside bus. The I/O bus 1022 is connected to a payout mechanism 1008, primary display 1010, secondary display 1012, value input device 1014, player input device 1016, information reader 1018, and storage unit 1030. The player input device 1016 can include the value input device 1014 to the extent the player input device 1016 is used to place wagers. The I/O bus 1022 is also connected to an external system interface 1024, which is connected to external systems 1004 (e.g., wagering game networks). The external system interface 1024 can include logic for exchanging information over wired and wireless networks (e.g., 802.11g transceiver, Bluetooth transceiver, Ethernet transceiver, etc.)

The I/O bus 1022 is also connected to a location unit 1038. The location unit 1038 can create player information that indicates the wagering game machine's location/movements in a casino. In some embodiments, the location unit 1038 includes a global positioning system (GPS) receiver that can determine the wagering game machine's location using GPS satellites. In other embodiments, the location unit 1038 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 10, in some embodiments, the location unit 1038 is not connected to the I/O bus 1022.

In one embodiment, the wagering game machine 1006 can include additional peripheral devices and/or more than one of each component shown in FIG. 10. For example, in one embodiment, the wagering game machine 1006 can include multiple external system interfaces 1024 and/or multiple CPUs 1026. In one embodiment, any of the components can be integrated or subdivided.

In one embodiment, the wagering game machine 1006 includes a group reward tracking module 1037. The group reward tracking module 1037 can process communications, commands, or other information, to track task completion for group rewards.

Furthermore, any component of the wagering game machine 1006 can include hardware, firmware, and/or machine-readable media including instructions for performing the operations described herein.

Example Mobile Wagering Game Machine

Figure 11:
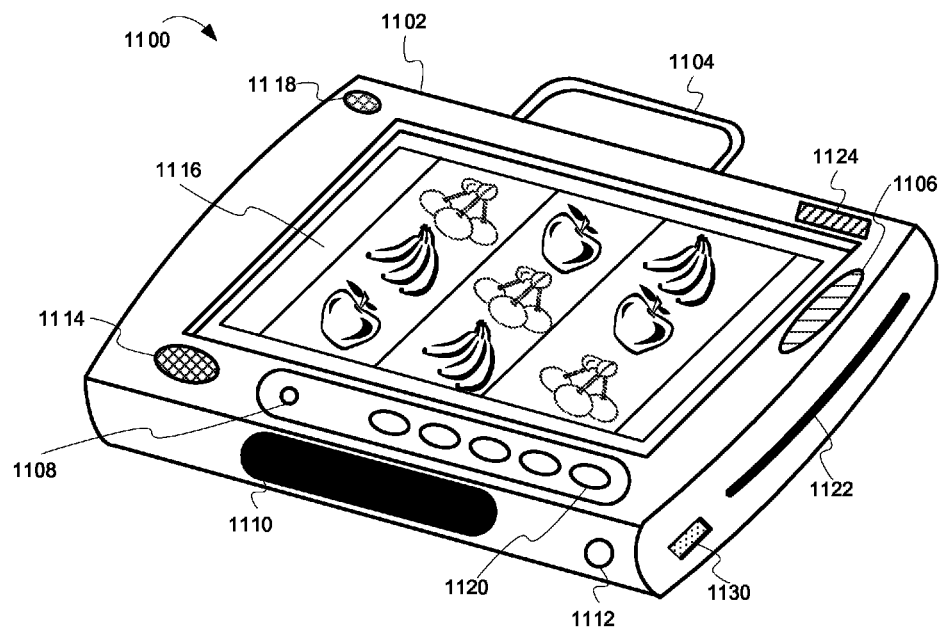
FIG. 11 is an illustration of a mobile wagering game machine 1100, according to some embodiments of the invention.

FIG. 11 is an illustration of a mobile wagering game machine 1100, according to some embodiments of the invention. In FIG. 11, the mobile wagering game machine 1100 includes a housing 1102 for containing internal hardware and/or software such as that described above vis-à-vis FIG. 10. In one embodiment, the housing has a form factor similar to a tablet PC, while other embodiments have different form factors. For example, the mobile wagering game machine 1100 can exhibit smaller form factors, similar to those associated with personal digital assistants. In one embodiment, a handle 1104 is attached to the housing 1102. Additionally, the housing can store a foldout stand 1110, which can hold the mobile wagering game machine 1100 upright or semi-upright on a table or other flat surface.

The mobile wagering game machine 1100 includes several input/output devices. In particular, the mobile wagering game machine 1100 includes buttons 1120, audio jack 1108, speaker 1114, display 1116, biometric device 1106, wireless transmission devices 1112 and 1124, microphone 1118, and card reader 1122. Additionally, the mobile wagering game machine can include tilt, orientation, ambient light, or other environmental sensors.

In one embodiment, the mobile wagering game machine 1100 uses the biometric device 1106 for authenticating players, whereas it uses the display 1116 and speakers 1114 for presenting wagering game results and other information (e.g., credits, progressive jackpots, etc.). The mobile wagering game machine 1100 can also present audio through the audio jack 1108 or through a wireless link such as Bluetooth.

In one embodiment, the wireless communication unit 1112 can include infrared wireless communications technology for receiving wagering game content while docked in a wager gaming station. The wireless communication unit 1124 can include an 802.11G transceiver for connecting to and exchanging information with wireless access points. The wireless communication unit 1124 can include a Bluetooth transceiver for exchanging information with other Bluetooth enabled devices.

In one embodiment, the mobile wagering game machine 1100 is constructed from damage resistant materials, such as polymer plastics. Portions of the mobile wagering game machine 1100 can be constructed from non-porous plastics which exhibit antimicrobial qualities. Also, the mobile wagering game machine 1100 can be liquid resistant for easy cleaning and sanitization.

In some embodiments, the mobile wagering game machine 1100 can also include an input/output ("I/O") port 1130 for connecting directly to another device, such as to a peripheral device, a secondary mobile machine, etc. Furthermore, any component of the mobile wagering game machine 1100 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments of the invention(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of operating a wagering game system, the method comprising:
   electronically initiating, via an electronic processing unit of the wagering game system, play of a wagering game presented via an electronic display device of the wagering game system, wherein the wagering game is associated with a player wagering account, wherein the wagering game system includes a value input device attached to a housing of the wagering game system, wherein the value input device is configured to receive a first monetary value for placement of wagers, wherein the wagering game system includes a value output device attached to the housing of the wagering game system, wherein the value output device is configured to provide, in response to user input, a second monetary value related to play of the wagering game, and wherein the play of the wagering game is associated with placement of at least one of the wagers;
   automatically accessing, via a network communication interface of the wagering game system, the player wagering account via a network;
   automatically selecting, based on analysis by the electronic processing unit of social network contact accounts stored in the player wagering account as social contacts, at least one social contact identifier of one of the social network contact accounts for presentation in place of a game play element of the wagering game in response to electronically determining that the one of the social network contact accounts has a higher percentage of completion of group tasks than others of the social network contact accounts;
   electronically providing the at least one social contact identifier for presentation via the electronic display device in place of the game play element of the wagering game;
   automatically determining, via the electronic processing unit, that the one of the social network contact accounts is eligible to be a member of a task-performance group according to the automatically selecting the at least one social contact identifier for presentation in place of the game play element of the wagering game;
   automatically assigning, via the electronic processing unit, the one of the social network contact accounts and the player wagering account as members of the task-performance group in response to the automatically determining that the one of the social network contact accounts is eligible to be the member of the task-performance group;
   automatically determining, via the electronic processing unit, one or more tasks to be performed by any one of the members of the task-performance group; and
   electronically providing an indication of the one or more tasks for presentation via the electronic display device.

2. The method of claim 1, wherein the automatically assigning the one of the social network contact accounts and the player wagering account as the members of the task-performance group comprises:
   presenting an option to the player wagering account to select the at least one social contact identifier, wherein the option presents the statistics of completion percentages of the past performance of group tasks by the one of the social network contact accounts; and
   including the one of the social network contact accounts as the member of the task-performance group in response to selection of the at least one social contact identifier.

3. The method of claim 1, wherein the one or more tasks are external to the wagering game.

4. The method of claim 1 further comprising:
   providing completion percentage statistics of one or more skill-based tasks that need to be completed beyond a wagering game machine for presentation via one or more of the player wagering account and the one of the social network contact accounts.

5. The method of claim 1 further comprising:
   determining that the one or more tasks have been completed by at least one of the members of the task-performance group; and
   assigning a reward to any one of the members of the task-performance group for completing the one or more tasks, wherein assigning the reward comprises proportioning the reward amongst the player wagering account and the one of the social network contact accounts based on a percentage of the one or more tasks respectively completed by the player wagering account and the one of the social network contact accounts.

6. The method of claim 1, wherein the at least one social contact identifier is provided for presentation in place of the game play element based additionally on one or more of similarities to game play history between the player wagering account and the one of the social network contact accounts, and a login locality of the one of the social network contact accounts.

7. A wagering game system comprising:
   one or more processors;
   a network communication interface configured to communicate via a network;
   a housing;
   a value input device attached to the housing, said value input device configured to receive first monetary value for placement of wagers on a wagering game;
   a value output device attached to the housing, said value output device configured to provide second monetary value related to play of the wagering game;
   an electronic display device; and
   one or more memory units configured to store instructions which, when executed by at least one of the one or more processors, cause the wagering game system to perform operations to
      electronically initiate play of the wagering game in a wagering game session, wherein the play of the wagering game is associated with placement of at least one of the wagers, and wherein the wagering game session is associated with a player wagering account,
      automatically access, via the network communication interface, the player wagering account via the network;
      automatically select, based on analysis by at least one of the one or more processors of social network contact accounts stored in the player wagering account as social contacts, at least one social contact identifier of one of the social network contact accounts for presentation via the electronic display device as a game play element of the wagering game in response to electronically determining that the one of the social network contact accounts has a higher percentage of completion of skill-based group tasks than others of the social network contact accounts, automatically integrate into the wagering game, as the game play element, the at least one social contact identifier, automatically determine that the one of the social network contact accounts is eligible to be a member of a group according to integration of the at least one social contact identifier into the wagering game, automatically assign the one of the social network contact accounts and the player wagering account as members of the group in response to determination that the one of the social network contact accounts is eligible to be the member of the group, and provide a set of skill-based group tasks for performance by the group.

8. The wagering game system of claim 7, wherein the one or more memory units are further configured to store instructions which, when executed by at least one of the one or more processors, further cause the wagering game system perform one or more operations to detect completion of the set of skill-based group tasks;

store completion percentage statistics of the set of skill-based group tasks by one or more of the player wagering account and the one of the social network contact accounts; and use the completion percentage statistics for automatic selection of the player wagering account and the one of the social network contact accounts for an additional group.

9. One or more non-transitory, machine-readable storage media having instructions stored thereon, which when executed by a set of one or more processors of a wagering game system cause the set of one or more processors to perform operations comprising:

initiating a wagering game;

electronically providing, via a network communication interface of the wagering game system, one or more group tasks for presentation via an electronic display device of the wagering game system in association with a wagering game session for the wagering game, wherein the wagering game session is associated with a player wagering account, wherein the wagering game system includes a value input device attached to a housing of the wagering game system, wherein the value input device is configured to receive first monetary value for placement of wagers, wherein the wagering game system includes a value output device attached to the housing of the wagering game system, and wherein the value output device is configured provide, in response to user input, a second monetary value related to play of the wagering game;

automatically accessing via the network communication interface of the wagering game system, the player wagering account via a network;

automatically selecting, based on analysis by the set of one or more processors of social network contact accounts stored in the player wagering account as social contacts, at least one social contact identifier of one of the social network contact accounts for presentation as part of a game play element of the wagering game for the wagering game session in response to electronically determining that the one of the social network contact accounts has a higher percentage of completion of group tasks than others of the social network contact accounts;

automatically determining, via the set of one or more processors, that the at least one social contact identifier, for the one of the social network contact accounts, is presented as part of the game play element of the wagering game, wherein the social network contact accounts are referenced in the player wagering account by the at least one social contact identifier;

automatically determining, via the set of one or more processors, that the one of the social network contact accounts, is eligible to perform the one or more group tasks in cooperation with the player wagering account based on the at least one social contact identifier being presented as the game play element of the wagering game, wherein the one or more group tasks are separate from the wagering game;

automatically assigning, via the set of one or more processors, the one of the social network contact accounts and the player wagering account as members of a task-performance group in response to the automatically determining that the one of the social network contact accounts is eligible to perform the one or more group tasks; and electronically providing an indication of the one or more group tasks for presentation via the electronic display device.

10. The one or more non-transitory, machine-readable storage media of claim 9, wherein the operations further comprise presenting one or more options to the player wagering account to select one or more of group task types and reward types.

11. The one or more non-transitory, machine-readable storage media of claim 9, wherein the operations further comprise presenting completion percentage statistics of the one or more group tasks in any one of the player wagering account and the one of the social network contact accounts.

12. The one or more non-transitory, machine-readable storage media of claim 9, wherein the operations further include determining that the one or more group tasks have been completed cooperatively by the player wagering account and the one of the social network contact accounts; and assigning a reward to one or more of the player wagering account and the one of the social network contact accounts, wherein the assigning the reward comprises proportioning the reward amongst the player wagering account and the one of the social network contact accounts based on a percentage of the one or more group tasks respectively completed by the player wagering account and the one of the social network contact accounts.

13. The one or more non-transitory, machine-readable storage media of claim 9, wherein the operations further comprise presenting one or more of a group reward indicator and a group member display.

14. The method of claim 1, wherein the providing the at least one social contact identifier for presentation as the game play element of the wagering game comprises presenting the at least one social contact identifier as a symbol associated with one or more of a slot reel and a playing card for the wagering game.

15. The method of claim 14, wherein the symbol is associated with an outcome for the wagering game.

16. The wagering game system of claim 7, wherein the one or more memory units are further configured to store instructions which, when executed by at least one of the one or more processors, further cause the wagering game system to perform one or more operations to provide, for presentation, an option to select the one of the social network contact accounts, wherein the option presents completion percentage statistics regarding past performance of the one of the social network contact accounts for one or more additional skill-based group tasks.

17. The wagering game system of claim 7, wherein the one or more memory units are further configured to store instructions which, when executed by at least one of the one or more processors, further cause the wagering game system to perform one or more operations to provide, for presentation, completion percentage statistics regarding a type of the set of skill-based group tasks previously performed by the one of the social network contact accounts.

18. The wagering game system of claim 7, wherein the one or more memory units are further configured to store instructions which, when executed by at least one of the one or more processors, further cause the wagering game system to perform one or more operations to present an indication of one or more additional groups competing against the player wagering account for the set of skill-based group tasks, wherein the indication of the one or more additional groups includes statistical percentage information about past competitions between the player wagering account and one or more additional members of the one of more additional groups.

19. The one or more non-transitory, machine-readable storage media of claim 9, wherein the at least one social contact identifier is selected for presentation as the game play element based on completion percentage statistics of past performance of skill-based group tasks by the social network contact accounts.

20. The one or more non-transitory, machine readable storage media of claim 9, wherein the operations further comprise storing an indication of selection by the player wagering account of the one of the social network contact accounts for use to automatically form an additional group for subsequent performance of additional group tasks.

21. The method of claim 1, wherein the automatically determining the one or more tasks to be performed comprises:
   electronically accessing, via the network communication interface, an indication of an advertising need; and
   automatically generating the one or more tasks related to the advertising need.

22. The method of claim 1, wherein the wagering game system is a mobile device and further comprising:
   electronically providing an indication of at least one task, from the one or more tasks, for completion beyond the wagering game at a specific geographic location;
   electronically detecting, via the mobile device, an indicia of completion of the at least one task;
   electronically detecting, via a location tracking unit of the mobile device, that the mobile device is located at the specific geographic location upon the electronically detecting the indicia of completion of the at least one task; and
   automatically reporting, via the network communication interface, completion of the at least one task in response to the electronically detecting that the mobile device is located at the specific geographic location upon the electronically detecting the indicia of completion of the at least one task.

* * * * *